Jan. 12, 1932.  C. O. STROMBECK  1,840,373

SHIPPING BASKET

Filed March 19, 1931

INVENTOR
Carl O. Strombeck
BY
Chappell Earl
ATTORNEYS

Patented Jan. 12, 1932

1,840,373

UNITED STATES PATENT OFFICE

CARL O. STROMBECK, OF PLYMOUTH, INDIANA, ASSIGNOR TO EDGERTON MANUFACTURING COMPANY, OF PLYMOUTH, INDIANA

SHIPPING BASKET

Application filed March 19, 1931. Serial No. 523,696.

It is very common practice to provide shipping baskets for fruit, vegetables and the like with covers having projecting portions engageable with the handles which constitute combined handles and cover fasteners, the handles being formed of wire.

The main object of this invention is to provide an improved structure which permits the repeated manipulation of the handle to secure or release the cover without undue effort and without permanent distortion of the handle or parts thereof.

Objects relating to details and economies of my invention will appear from the description to follow. The invention is defined and pointed out in the claims.

A structure which is a preferred embodiment of my invention is illustrated in the accompanying drawings, in which.

Figure 1:
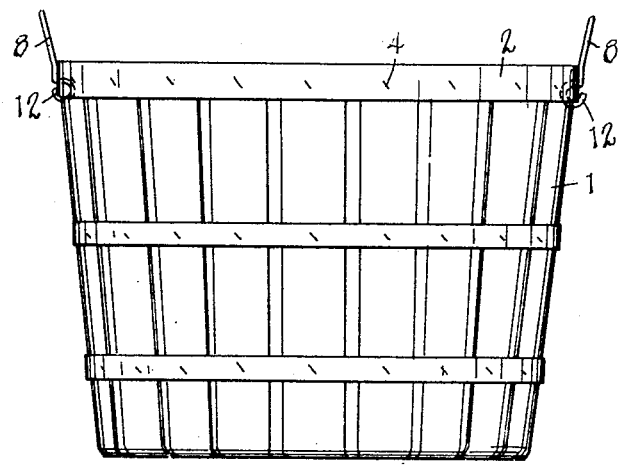
Fig. 1 is a side view of a basket embodying the features of my invention.

Referring to the drawings, the staves 1 of the basket are arranged in a well-known manner and provided with an outer top hoop 2 and inner top hoop 3, these hoops being secured to the staves by means of the staples indicated at 4.

The cover comprises a rim 5 and cross slats, certain of which, as 6, project beyond the rim and constitute handle engaging members 7.

The combined handle and cover fasteners 8 are of general bail-shape and disposed on the outer sides of the top hoop 2.

The arms of the handles have attaching portions at their lower ends, these attaching portions having downwardly inclined portions 9 inserted through the inner and outer top hoops and intervening staves in a downwardly inclined relation. The attaching or prong portions of the handles are then curved downwardly at 10 on the inner side of the inner hoop, then passed outwardly and downwardly through the staves below the top hoops providing downwardly inclined portions 11. The outer ends 12 are bent upwardly or disposed in an upwardly and outwardly inclined relation in rocking engagement with the outer side of the outer hoop.

Figures 3, 4:
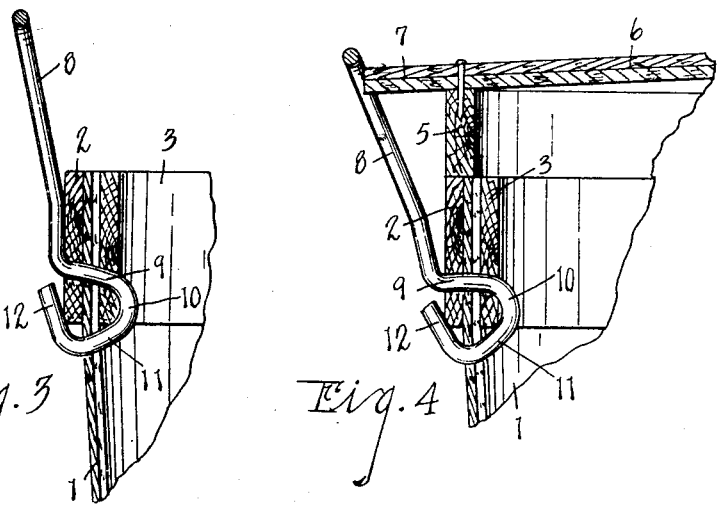
Fig. 3 is an enlarged fragmentary view mainly in vertical section on line 3—3 of Fig. 2, showing details of the handle and its connection to the basket.
Fig. 4 is a fragmentary view corresponding to that of Fig. 3 with the cover in place and the handle sprung out to permit the placing of the cover, the handle being shown in its normal position in Fig. 3 and in cover receiving position in this Fig. 4.
Figure 2:
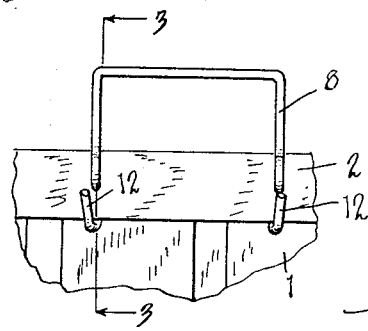
Fig. 2 is a fragmentary view looking from the left of Fig. 1.

The handles thus attached may be rocked or pivoted on their attaching members as indicated in Figs. 3 and 4 so that the handles may be swung outwardly to receive the cover portions 7 and then swung inwardly into retaining position and this without any substantial bending of the handle.

The handle may thus be repeatedly manipulated without distortion of the handle and no parts are left projecting into the receptacle to injure the contents as results from manipulation of certain handles now quite generally used and there is the further advantage that the handle is easily applied by means of machinery.

A further advantage is that the handle has very secure engagement with the basket, having an effective double hold thereon, since it lifts from the point where it is passed through the hoop and also the bottom of the hoop. Even should the hoop be split the handle still remains effective.

Having thus described my invention, what I claim as new and desire to secure by Letters Patent, is:

1. The combination with a basket comprising staves and inner and outer top hoops secured upon the upper ends thereof, of a bail-shaped handle and cover fastener disposed on the outer side of the outer hoop and having its ends passed inwardly in a downwardly inclined relation through the hoops and the intervening slats in substantially spaced relation to the upper edge of the top hoops, thence curved downwardly and passed outwardly in a downwardly inclined relation through the slats below the hoops, the ends being disposed in an upwardly projecting outwardly inclined relation at the outer side of the outer hoop providing a rocking or pivotal connection for the handle to the basket whereby the handle may be swung away from or toward the side of the basket without substantial bending of the handle.

2. The combination with a basket provided with a top hoop, of a bail-shaped handle and cover fastener disposed on the outer side of the top hoop and having its ends passed inwardly in a downwardly inclined relation through the hoop in spaced relation to its upper edge, thence curved downwardly and passed outwardly in a downwardly inclined relation through the basket wall below the hoop, the ends being disposed in an upwardly projecting outwardly inclined relation at the outer side of the hoop providing a rocking or pivotal connection for the handle to the basket whereby the handle may be swung away from or toward the side of the basket without substantial bending of the handle.

3. The combination with a basket provided with a top hoop, of a bail-shaped handle disposed on the outer side of the hoop and having its ends passed inwardly through the hoop in a spaced relation to the upper edge thereof and thence curved downwardly and passed outwardly below the hoop and thence turned upwardly into sliding engagement with the outer side of the hoop providing a pivotal or rocking connection for the handle to the basket permitting movement of the handle to and from the basket to receive and engage a hoop element without substantial bending or springing of the handle.

4. The combination with a receptacle, of a bail-shaped handle disposed on the outer side of the receptacle and having its ends passed inwardly through the wall of the receptacle in spaced relation to its upper edge and thence passed downwardly and outwardly and turned upwardly at the outer side of the receptacle, the receptacle engaging parts of the handle being conformed to permit rocking or pivotal movement of the handle.

In witness whereof I have hereunto set my hand.

CARL O. STROMBECK.